BEST AVAILABLE COPY

A. N. MERRILL.

Farmer's Boiler.

No. 4,062. Reissued July 5, 1870.

Witnesses:

Victor Hagmann

W. K. Ellsworth

Inventor:

A. N. Merrill per Munn & Co

Attorneys.

N. PETERS, Photo-Lithographer, Washington, D. C.

UNITED STATES PATENT OFFICE.

ALLEN N. MERRILL, OF BATAVIA, ILLINOIS.

FARMER'S BOILER.

*Specification forming part of Letters Patent No.* 98,988, *dated January* 18, 1870; *reissue No* 4,062, *dated July* 5, 1870.

*To all whom it may concern:*

Be it known that I, ALLEN N. MERRILL, of Batavia, in the county of Kane and State of Illinois, have invented a new and useful Improvement in Farmers' Boilers, of which the following is a specification, reference being had to the accompanying drawings, which form a part thereof.

The object of my invention is to make a cheap, durable, and portable boiler for farmers to use for cooking feed for stock; and the nature of the invention consists in providing the top of the fire-pot with projections or supports for supporting the kettle, so that it will rest upon the fire-pot and not upon the case; and it further consists in the combination of the various parts, hereafter specified, to make a compact, portable boiler.

Figure 2:
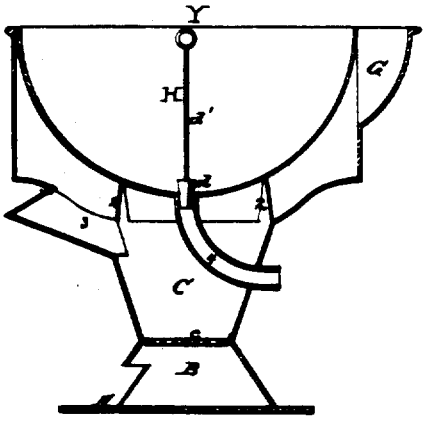
Figure 1:
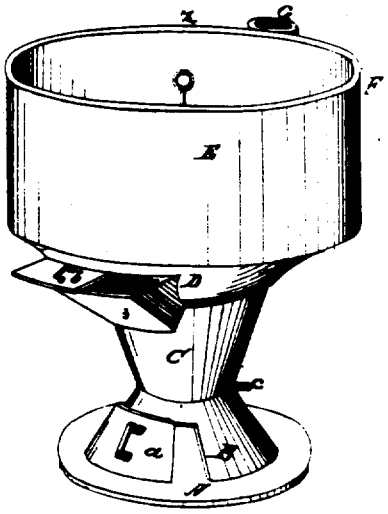
Figure 3:
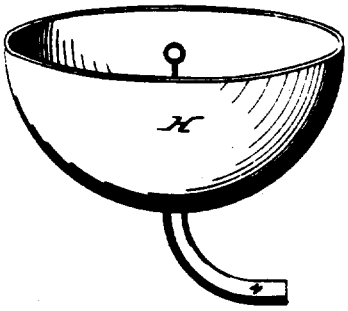
Figure 4:
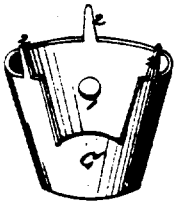

Figure 1 is a perspective view of the entire boiler; Fig. 2, a transverse vertical section; Fig. 3, a perspective view of the kettle; Fig. 4, a perspective view of the fire-pot; and Fig. 5, a perspective view of the feed-spout.

Figure 5:
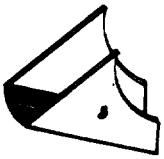

A is the bottom piece of the boiler; B, a conical casting, forming an ash-space beneath the fire-pot; C, the fire-pot, resting upon the conical casting B, as shown, in which there is a grate, *c*. The fire-pot is made with an opening, O, on one side for the admission of coal, and it has at its top projections or supports 2 upon which the kettle H rests. H may be an ordinary kettle, or there may be a pipe, 4, extending from the bottom of the kettle to carry off the contents thereof if desired. The stopper *d* may be used to close the pipe. E is a jacket, surrounding the kettle in such a way as to make a space between the jacket and kettle for the heat to pass around the kettle. G is the smoke-pipe. D is an inverted cone resting on the fire-pot, and makes a support for the jacket or case E. 3 is a fuel-spout, which is made in one piece, as shown in Fig. 5, and secured to the fire-pot and boiler, as shown. It has a cover, *b*.

By this arrangement coal can be fed into the coal-pot by simply removing the cover *b*. The draft to the fire is through the base cone B of the boiler.

I have a light conical fire pot, requiring no fire-brick, with a grate at its base that can be shaken and dumped, the ashes falling into an ash-pit beneath. The conical shape of the fire-pot causes the coal, that is conveniently fed therein through the feed-spout by simply removing the cover, to fall upon the fire-grate in a small space, and the projections 2 support the kettle, making it firm upon the fire-pot. It is a light portable boiler, readily managed in every particular.

I claim—

1. Providing the fire-pot C with the projections or supports 2, for the purpose of supporting the kettle, substantially as set forth.

2. The conical base B, conical fire-pot C, provided with projections 2, the fire-grate *c*, cone D, jacket E, and kettle H, when constructed and operating substantially as described and shown.

ALLEN N. MERRILL.

Witnesses:

L. L. COBURN,

J. L. COBURN.